United States Patent [19]

Jackson

[11] Patent Number: 4,780,235

[45] Date of Patent: Oct. 25, 1988

[54] PAINT REMOVER

[75] Inventor: Harold L. Jackson, Hockessin, Del.

[73] Assignee: E. I. Du Pont de Nemours and Company, Wilmington, Del.

[21] Appl. No.: 39,117

[22] Filed: Apr. 16, 1987

[51] Int. Cl.$^4$ ............... C11D 7/50; C11D 7/52; C09D 9/00; C23G 5/02
[52] U.S. Cl. ................... 252/170; 252/171; 252/163; 252/164; 252/162; 252/174.19; 252/542; 252/DIG. 8
[58] Field of Search ............ 252/163, 164, 162, 170, 252/171, 174.19, 542, DIG. 8

[56] References Cited

U.S. PATENT DOCUMENTS

| | | | |
|---|---|---|---|
| 3,806,460 | 4/1974 | Mukai et al. | 252/111 |
| 3,972,839 | 8/1976 | Murphy | 252/548 |
| 4,120,810 | 10/1978 | Palmer | 252/153 |
| 4,477,288 | 10/1984 | Kazmierczak et al. | 134/19 |
| 4,666,626 | 5/1987 | Francisco | 252/153 |
| 4,673,524 | 6/1987 | Dean | 252/118 |

FOREIGN PATENT DOCUMENTS 3438399   3/1986   Fed. Rep. of Germany.

*Primary Examiner*—Paul Lieberman
*Assistant Examiner*—Ronald A. Krasnow

[57] ABSTRACT

A low toxicity paint remover composition containing $C_1$ to $C_4$ dialkyl esters of $C_4$ to $C_6$ aliphatic dibasic acid, an activator, a thickener, a surfactant and at least one other organic nonhalogen-containing solvent.

10 Claims, No Drawings

PAINT REMOVER

FIELDS OF THE INVENTION

This invention relates to a composition of matter suitable for use as a paint remover. The composition is less hazardous to use than conventional paint remover.

BACKGROUND OF THE INVENTION

A common commercially available class of paint remover contains a high percentage of methylene chloride. Although methylene chloride based paint removers are inexpensive and quite effective, such paint removers may be hazardous to the health of the user if not properly handled. U.S. Pat. No. 2,507,983 discloses methylene chloride based paint removers.

As a less hazardous substitute for methylene chloride based paint removers, N-methyl-2-pyrrolidone based materials have been proposed. Such materials are effective, but also quite expensive. Paint removers based on N-methyl-2-pyrrolidone are disclosed in U.S. Pat. No. 4,120,810.

As another substitute for the more toxic methylene chloride based paint removers, compositions containing dialkyl esters of succinic glutaric and adipic acid have been disclosed. German Pat. No. 3,438,399 (granted Mar. 20, 1986) shows such a paint removing composition.

SUMMARY OF THE INVENTION

The present invention is a paint removing composition which comprises (a) at least 20% by weight of, at least one $C_1$ to $C_4$ dialkyl ester of a $C_4$ to $C_6$ aliphatic dibasic acid, (b) 0.1 to 5% by weight of an activator, (c) an effective amount of a thickener, (d) an effective amount of a compatible surfactant, and (e) from 1 to 80% by weight of at least one nonhalogen-containing-organic solvent.

Activators for the paint removers of this invention are of two different types, i.e., basic activators such as ammonium hydroxide and monoethanolamine, and acidic activators such as formic acid, acetic acid and oxalic acid.

Suitable nonhalogen-containing-organic solvents are preferably those that have high flash points, i.e., above about 140° F. Such solvents include N-methyl-2-pyrrolidone, esters of monoalkyl ethers of dipropylene glycol, and esters of monoalkyl ethers of tripropylene glycol, and blends of hydrocarbons sometimes called "heavy aromatic naptha"—See U.S. Pat. No. 4,120,810, column 3.

The composition of the invention also contains an effective amount of at least one thickener. Suitable thickeners for paint removers are known in the art and include ethylcellulose, hydroxypropyl cellulose, organic modified clay and hydrogenated castor oil. The amount of thickener required depends in part on the other ingredients present in the composition, but in general an amount between about 0.5 and 10% by weight is effective.

The final ingredient required by the composition is an effective amount of a compatible surfactant. The surfactant is primarily included in the composition to enhance the water wash of the substrate to remove the paint residue and the other ingredients from the substrate. Suitable surfactants include potassium oleate, the dioctyl ester of sodium sulfosuccinic acid, sodium alkyl napthalene sulfonate, sodium alkyl benzene sulfonate and the like.

DETAILED DESCRIPTION

The paint remover of this invention comprises at least 20% and preferably at least 40% by weight of at least one $C_1$ to $C_4$ dialkyl ester of at least one $C_4$ to $C_6$ aliphatic dibasic acid. The dialkyl ester in most cases will be of a mixture of $C_4$ to $C_6$ aliphatic dibasic acid. Mixtures of $C_4$ to $C_6$ dibasic acids are a byproduct of the manufacture of adipic acid—an acid that is used commercially on a large scale in the production of some types of nylon. Suitable dialkyl esters for use in the present invention are obtained by the esterification of such a byproduct stream. The composition of such a byproduct stream varies considerably, but in general will contain about 15 to 30 percent succinic acid, 50 to 73 percent glutaric acid, and about 6 to 25 percent adipic acid. The methyl esters of such a mixture of acids is usually the most economically attractive, but ethyl, propyl and butyl esters are also useful.

The other solvent in the paint remover is a nonhalogen-containing-organic solvent. Nonhalogen-containing solvents which may be used in conjunction with the dibasic ester are of two types. One is a functional group-containing solvent which can have the effect of increasing removal effectiveness on a particular type of substrate or can modify the performance of a thickener. This type solvent may make up 1 to 50% by weight of the paint remover composition. Preferred are high flash point solvents such as N-methyl-2-pyrrolidone, and esters of dipropylene and tripropylene glycol ethers. Other nonhalogen-containing solvents which can be used but may be less desirable because of toxicity, cost, odor or volatility are $C_1$ to $C_{12}$ alcohols, including isopropanol and benzyl alcohol; ethers of ethylene and propylene glycols and their esters; $C_3$ to $C_{12}$ ketones including acetone, diacetone alcohol and acetophenone; acetate esters of $C_1$ to $C_{12}$ aliphatic alcohols; organic nitriles including acetonitrile and benzonitrile; nitropropane; propylene carbonate, and ethyl-3-ethoxypropionate. The second type of nonhalogen-containing solvents is a high flash point, highly aromatic blend of hydrocarbons often referred to as "aromatic naphtha". Examples are Exxon Chemicals' Aromatic 150, Shell Chemicals' Cyclo Sol 63, Amoco's Panasol AN-3N, and Texaco's Aromatic Solvent 400, each of which contain mainly $C_8$ and higher alkyl benzenes and/or naphthalenes. This second type of solvent may make up 10 to 60% by weight of the paint remover composition. Although these solvents serve primarily to maximize cost-performance of the remover mixture, for certain coatings such as alkyd enamels, the mixture of aromatic solvent and dibasic ester solvent provides enhanced removal action.

The Aromatic 150 solvent is a high purity aromatic mixture of $C_9$ to $C_{12}$ aromatics. The mixture contains about 8% $C_9$ aromatic compounds, about 74% $C_{10}$ aromatic compounds, about 15% $C_{11}$ aromatic compounds, and about 1% $C_{12}$ aromatic compounds, and about 1% of nonaromatic compounds. This mixture has a flash point of 150° F. (Flash point is defined as the temperature at which a liquid gives off a vapor sufficient to form an ignitable mixture with air near the surface of the liquid.)

EXAMPLE I

The following ingredients were mixed in a closed container:

39.5 parts by weight dibasic ester (containing about 17% by weight dimethyl succinate, 66% by weight dimethyl glutarate, and 17% by weight dimethyl adipate)
5.0 parts by weight N-methyl-2-pyrrolidone
2.5 parts by weight ethyl cellulose
2.0 parts by weight potassium oleate
1.0 parts by weight acetic acid.

EXAMPLE II

The following ingredients were mixed in a closed container:
25.0 parts by weight of the dibasic ester of Example I
5.0 parts by weight of N-methyl-2-pyrrolidone
14.5 parts by weight Aromatic 150
1.0 parts by weight monoethanolamine
2.5 parts by weight ethyl cellulose
2.0 parts by weight potassium oleate.

Paint Removal Results

The compositions obtained from Example I and II were tested for their ability to remove various paints from pineboard surfaces. Eight different painted surfaces were employed in the test. The samples are identified and characterized in Table I below:

TABLE I

| Sample No. | Paint Type | Solvent or water based | Brand | Color |
|---|---|---|---|---|
| | | | Primer | |
| 1 | Latex exterior enamel | Water | Bruning 1210 Undercoat | White |
| 2 | Alkyd enamel exterior | Solvent | Bruning 1210 Undercoat | White |
| 3 | Lacquer | Solvent | Parks Gloss Lacquer | Clear |
| 4 | Vinyl acrylic interior | Water | Bruning 1210 Undercoat | White |
| 5 | Epoxy | Solvent | Bruning 1210 Undercoat | White |
| 6 | Polyurethane varnish | Solvent | McCloskey Gloss Polyurethane | Clear |
| 7 | Marine paint | Solvent | Pettit Specialty Fiberglass Undercoat | White |
| 8 | Marine varnish | Solvent | McCloskey Man-O-War Gloss Spar | Clear |
| | | | First Coat | |
| 1 | Latex exterior enamel | Water | Muralo Latex High Gloss Enamel | Red |
| 2 | Alkyd enamel exterior | Solvent | Bruning House And Trim | Red |
| 3 | Lacquer | Solvent | Parks Gloss Lacquer | Clear |
| 4 | Vinyl acrylic interior | Water | Muralo Semi Gloss Vinyl Acrylic Latex | Red |
| 5 | Epoxy | Solvent | Bruning Chemical Resistant Modified | Purple |
| 6 | Polyurethane varnish | Solvent | McCloskey Gloss Polyurethane (Thinned 20%) | Clear |
| 7 | Marine paint | Solvent | Pettit Easypoly High Gloss Marine | Orange |
| 8 | Marine varnish | Solvent | McCloskey Man-O-War Gloss Spar (Thinned 20%) | Clear |
| | | | Second Coat | |
| 1 | Latex exterior enamel | Water | Muralo Latex High Gloss Enamel | Grey |
| 2 | Alkyd enamel exterior | Solvent | Bruning House And Trim | Grey |
| 3 | Lacquer | Solvent | Parks Gloss Lacquer | Clear |
| 4 | Vinyl acrylic interior | Water | Muralo Semi Gloss Vinyl Acrylic Latex | Grey |
| 5 | Epoxy | Solvent | Epoxy Coating #660 White Base | Grey |
| 6 | Polyurethane varnish | Solvent | McCloskey Gloss Polyurethane | Clear |
| 7 | Marine paint | Solvent | Finish | Grey |

TABLE I-continued

| Sample No. | Paint Type | Solvent or water based | Brand | Color |
|---|---|---|---|---|
| 8 | Marine varnish | Solvent | McCloskey Man-O-War Gloss Spar (Thinned 20%) | Clear |

As can be seen from Table I each sample had three layers of paint.

The compositions of Example I and II, as well as two different commercially available methylene chloride based paint removers were applied with a brush to different portions of each of the eight panels. After 20 minutes the panels were scraped. The results are tabulated below in Table II. Table II shows the relative results of the paint removers, i.e., a rating of 1 means that on that particular panel this sample removed more paint or more paint layers, or exposed more wood grain than the other paint removers shown, while a rating of 4 means that on that particular panel, the sample removed less paint or less paint layers or exposed less wood grain than the other paint removers shown.

TABLE II

| Panel # | Ex. I | Ex. II | Control 1** | Control 2*** |
|---|---|---|---|---|
| 1 | 1 | 2 | 3 | 4 |
| 2 | 3 | 4 | 1 | 2 |
| 3* | | | | |
| 4 | 1 | 4 | 2 | 3 |
| 5 | 3 | 4 | 2 | 1 |
| 6 | 1 | 4 | 2 | 3 |
| 7 | 3 | 4 | 2 | 1 |
| 8 | 1 | 4 | 2 | 3 |

*All four of the paint removers removed all of the paint on this panel.
**Control 1 is a commercially available methylene chloride based paint remover which also contains mineral spirits and methanol.
***Control 2 is a commercially available methylene chloride based paint remover which also contains methanol.

I claim:
1. A paint removing composition consisting essentially of (a) at least 20% by weight of at least one $C_1$ to $C_4$ dialkyl ester of a $C_4$ to $C_6$ aliphatic dibasic acid, (b) 0.1 to 5% by weight of an activator, selected from the group consisting of formic acid, acetic acid and oxalic acid or selected from the group consisting of ammonium hydroxide and monoethanolamine, (c) an effective amount of at least one thickener, (d) an effective amount of a compatible surfactant, and (e) from 1 to 80% by weight of at least one nonhalogen-containing-organic solvent.

2. The composition of claim 1 which consists of the listed components, and in which the nonhalogen-containing-organic solvent is selected from the class consisting of high flash point solvents.

3. The composition of claim 2 in which the high flash point solvent is at least one member of the group consisting of N-methyl-2-pyrrolidone, esters of monoalkyl ether dipropylene glycol, and esters of monoalkyl ether tripropylene glycol.

4. The composition of claim 1 in which the nonhalogen solvent is a blend of aromatic hydrocarbons.

5. The composition of claim 1 in which the thickener is present in an amount of 0.5 to 10% by weight.

6. The composition of claim 5 in which the thickener is selected from the class consisting of ethyl cellulose, hydroxypropyl cellulose, organic modified clay, and hydrogenated castor oil.

7. The composition of claim 1 in which the surfactant is selected from the class consisting of potassium oleate, dioctyl ester of sodium sulfosuccinic acid, and sodium alkyl napthalene sulfonate.

8. The composition of claim 1 in which the activator is ammonium hydroxide, and the nonhalogen-containing-organic solvent is N-methyl-2-pyrrolidone.

9. The composition of claim 1 in which the $C_1$ to $C_4$ dialkyl ester of a $C_4$ to $C_6$ aliphatic dibasic acid is present in the amount of at least 40% by weight, and the nonhalogen-containing organic solvent is present in the amount of between 1 and 60% by weight.

10. The composition of claim 1 in which the nonhalogen-containing-organic solvent is N-methyl-2-pyrrolidone, and the activator is acetic acid.

* * * * *